(12) United States Patent
Kropp

(10) Patent No.: US 9,934,545 B2
(45) Date of Patent: Apr. 3, 2018

(54) METHOD FOR THE HANDLING AND/OR MARKETING OF ITEMS BY A WAREHOUSE AND A WAREHOUSE

(71) Applicant: Daniel Kropp, Schoneck (DE)

(72) Inventor: Daniel Kropp, Schoneck (DE)

( * ) Notice: Subject to any disclaimer, the term of this patent is extended or adjusted under 35 U.S.C. 154(b) by 76 days.

(21) Appl. No.: 15/001,518

(22) Filed: Jan. 20, 2016

(65) Prior Publication Data
US 2017/0024838 A1 Jan. 26, 2017

(30) Foreign Application Priority Data
Jul. 21, 2015 (DE) .................... 20 2015 103 841 U

(51) Int. Cl.
| | |
|---|---|
| G06F 7/00 | (2006.01) |
| G06Q 50/28 | (2012.01) |
| B65C 1/04 | (2006.01) |
| G06Q 10/08 | (2012.01) |
| G07F 11/62 | (2006.01) |
| B65G 1/137 | (2006.01) |
| G06F 21/31 | (2013.01) |
| G06K 7/10 | (2006.01) |
| G06Q 20/20 | (2012.01) |

(52) U.S. Cl.
CPC .............. *G06Q 50/28* (2013.01); *B65C 1/04* (2013.01); *B65G 1/1373* (2013.01); *G06F 21/31* (2013.01); *G06K 7/10544* (2013.01); *G06Q 10/08* (2013.01); *G06Q 20/202* (2013.01); *G07F 11/62* (2013.01)

(58) Field of Classification Search
None
See application file for complete search history.

(56) References Cited

U.S. PATENT DOCUMENTS

| | | | |
|---|---|---|---|
| 5,997,928 A | 12/1999 | Kaish et al. | |
| 6,974,928 B2 * | 12/2005 | Bloom | B07C 3/00 209/583 |

(Continued)

FOREIGN PATENT DOCUMENTS

| | | |
|---|---|---|
| EP | 1 170 686 A1 | 6/2001 |
| EP | 2525309 A1 | 11/2012 |
| WO | 03016151 A2 | 2/2003 |

OTHER PUBLICATIONS

European Office Action dated Jan. 27, 2017 for EP Application No. 14 177 915.7-1871.

*Primary Examiner* — Yolanda R Cumbess
(74) *Attorney, Agent, or Firm* — Ladas & Parry LLP

(57) ABSTRACT

A method and a warehouse for handling items stored in a warehouse by a first actor, and are removed from the warehouse by a second actor, wherein, upon an automated receiving of the items by the warehouse, an individual item-specific or actor-specific identification is detected, inputted or generated by the warehouse, wherein the items are associated with one of the actors by assigning the individual identification and are stored according to the association in the warehouse, wherein the individual identification contains information about the storage conditions of the item and that the items delivered to the warehouse are received by a handling system and are stored according to the individual identification under different storage conditions in a shelf system of the warehouse.

22 Claims, 6 Drawing Sheets

(56) References Cited

U.S. PATENT DOCUMENTS

Figure 1:
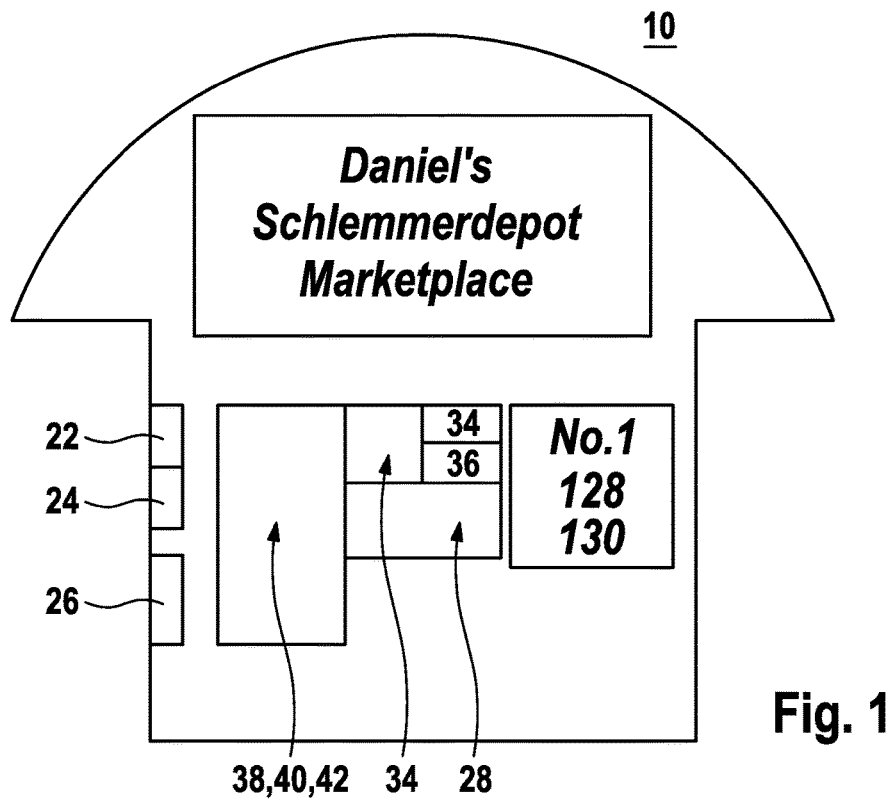

| | | | |
|---|---|---|---|
| 2001/0042024 A1* | 11/2001 | Rogers | G06Q 10/0637 |
| | | | 705/26.81 |
| 2005/0047895 A1* | 3/2005 | Lert, Jr. | B65G 1/0492 |
| | | | 414/273 |
| 2007/0150375 A1 | 6/2007 | Yang | |
| 2008/0238615 A1* | 10/2008 | Carpenter | B62B 3/1424 |
| | | | 340/5.91 |
| 2008/0294475 A1* | 11/2008 | Zenor | G06Q 30/02 |
| | | | 705/7.31 |
| 2013/0091873 A1* | 4/2013 | H | G06Q 10/0832 |
| | | | 62/56 |
| 2015/0310694 A1* | 10/2015 | Will | G07F 11/165 |
| | | | 221/13 |

\* cited by examiner

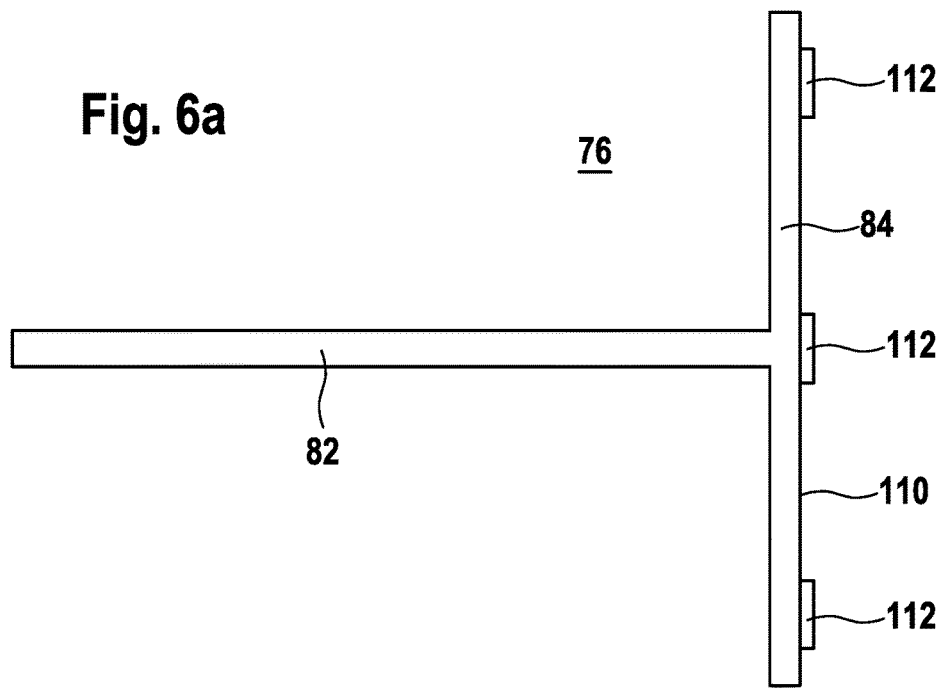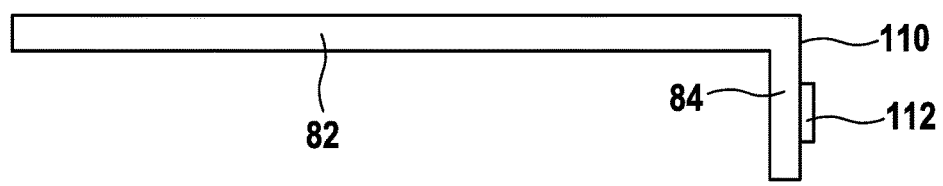

METHOD FOR THE HANDLING AND/OR MARKETING OF ITEMS BY A WAREHOUSE AND A WAREHOUSE

The invention relates to a method for the handling and/or marketing of items and to an apparatus for carrying out the method.

A method and an apparatus for the handling and/or distribution of items which are stored by at least one actor such as a supplier in a warehouse and removed by at least one second actor such as a taker or customer from the warehouse is known from US 2007/150375 A1. Upon a reception of the items by the warehouse an individual item-specific and/or actor-specific identification is detected, inputted or generated by the warehouse. Then, the items are stored in a compartment system, comparable to a deposit-box system. Therefore, a separately closable compartment must be reserved for each item, which is associated with elevated expense and limits the flexibility of storage.

EP 2 525 309 A1 relates to a system for making groceries available for end consumers and comprises one, preferably several decentralized consumption stations, a central consignment station, a central storage, shopping carts and a decentralized pick-up station. Orders can be transmitted from a consumer station to the central consignment station. Consigned shopping carts are intermediately stored in the decentralized, stationary pick-up station for being picked up by the consumer and are brought to his residence. For items reserved under certain conditions, transfer containers are provided that are constructed as refrigeration boxes. The refrigeration boxes increase the storage volume, as a result of which the storage capacity at the same spatial volume is reduced. Also, the refrigeration boxes must be removed and disposed of after the removal of the items, which is also associated with elevated expense.

Another method for handling items by a warehouse of the initially cited type is described in WO03/016151 A2. The warehouse in the form of a vending machine comprises several loading boxes that are combined in a transportable container that is filled on the work side with previously prepared foods, beverages, vegetables or ready salads, condiments, soups, bakery items, ice cream and additives that can be set in the vending machine and can be removed again after emptying. The vending machine serves for the preparation and making ready of food and the delivery of the contents of the package and comprises devices for selecting a dish and a beverage from the loading box as well as transport devices for conducting them through a microwave oven, a beverage filling device, a delivery unit to the consumer, an expansion preparation unit and a cooling unit.

However, the vending machine is not suitable for receiving items from different suppliers and for transporting them—determined individually for the customer—to the customer from the warehouse.

U.S. Pat. No. 5,997,928 describes a method and an apparatus for checking the content of sales systems. The method and the apparatus are designed in such a manner as to check the quality of food in a shopping cart. The foods are contained in a closed, air-conditioned, drivable or mobile or stationary service station. The offered items are individualized by one or more suppliers but not for one customer.

Starting from the above, the present invention has the basic task of further developing a method for handling and/or distributing items by a warehouse and further developing a warehouse of the initially cited type in such a manner that the greatest possible freedom regarding time, location and type of storage and transfer is offered by actors in the form of suppliers and customers in the placing of orders and also in the transmission of orders.

The task is solved in accordance with the invention by, among other things, a method with the features of claim 1.

The method in accordance with the invention offers the possibility of distributing, automatically receiving and automatically delivering items.

The invention provides that the individual identification contains information about the association of the item to the at least one first and/or second actor and/or information about the storage conditions or due dates of the items.

The items supplied in the order of the at least one second actor by the at least one first actor to the warehouse is received by a handling system and stored in accordance with the individual identification in the warehouse.

Groceries are stored in the warehouse according to their individual identification under different storage conditions such as temperature and moisture.

According to the method of the invention items offered by different first actors such as suppliers can be ordered by different second actors such as takers or customers, wherein the first actors then supply the items to the warehouse specifically for the taker or the customer and the second actor such as a taker or customer can then retrieve the items after identification or inputting an individual identification from the warehouse.

The individual identification can be an item-specific and/or actor-specific, in particular taker-specific identification.

A preferred method of procedure is characterized in that the individual identification is detected by scanning the items or by a coding associated with the items such as by EAN code or QR code and/or by an input of the first actor and/or is generated by outputting a document or a visual display in the warehouse or on an external device such as a mobile data device or PC. The individual identification can be known to the second actors such as a taker or can be transmitted to him by the first actor such as a supplier.

The above measures make possible an automated reception of the items and an individual association of the items with one of the actors.

Furthermore, it is provided that the items associated with one of the actors are preferably stored in the warehouse without being associated with each other and automatically supplied to a delivery area after the input of the individual identification by the handling system.

The reception and distribution of the items within the warehouse takes place by the handling system installed in the warehouse. Consequently, an actor such as a customer orders items from different actors such as suppliers. The items are transmitted from the warehouse—individually matched to the actors such as customers—to the actors such as customers.

There is therefore a possibility for the client to shop whenever he would like to. The actors can ensure that the items are properly stored in the warehouse since the deliveries are not dependent on individual deliveries to the actor such as a customer.

The second actor can therefore order items from different first actors such as suppliers. The latter can store the items matched individually to the second actor such as a customer in the warehouse and transfer it to him from the warehouse.

It is furthermore provided that an identification of the second actor such as a customer takes place by an identification system such as a touch screen display, fingerprint sensor and/or card reader and is compared to the individual identification of the item associated with the actor.

The task is solved in accordance with the invention by a warehouse with the features of claim 7.

Such a warehouse is characterized in that the means for receiving the items automatically detect an individual identification of the items and/or generate an individual identification, as a result of which an association of the items to one of the takers takes place, that the items are stored by a handling system in the warehouse in accordance with their individual identification, and that the items associated with one of the takers is supplied to a distribution by the automated distribution after the inputting for detection of the individual identification.

It is provided for the storage of different items that the warehouse comprises storage areas with different air-conditioning zones and at least one air conditioning apparatus for regulating the temperature and the air humidity of the air-conditioning zones.

The handling system comprises a handling system in the form of a warehouse robot as well as a storage system in the form of a shelf system for the deposition of the item, wherein the storage of the items preferably takes place without them being associated with each other.

A preferred embodiment is characterized in that the means for the automatic reception comprises a means for detecting the individual identification of the items such as a scanning system or means for the manual or electronic inputting of the individual identification such as a keyboard or touchscreen.

The warehouse preferably comprises for the automated reception and/or automatic distribution of the items at least one input/output shaft or alternatively at least one output shaft and at least one input shaft and/or an input/output shaft.

A preferred embodiment is characterized in that the handling system and/or the warehouse comprises means for receiving payments and/or barcodes.

Furthermore, the warehouse and/or handling system can be connected by a communication interface to a data network such as the Internet in order to receive orders from actors and retrieve information about the stored items.

The warehouse itself can preferably be constructed to be modular such as, e.g. an isolated container so that there is the possibility of expanding the storage system.

The solution requires not only a simple warehouse for items such as groceries but also an intelligent warehouse such as a grocery warehouse which operates in an extraordinary manner, is integrated, is completely self-sufficient and independent, is operated in a completely automated manner and gives in the optimal case not only one but simultaneously many different actors such as grocery sellers the possibility of supplying good items such as groceries 7 days a week, 24 h daily to the warehouse and wherein the actors such as customers can retrieve them daily 7 days a week, 24 hours there. In other words, the invention is a preferably mobile, air-conditioned warehouse with the possibility of making available for distribution the automated reception and the automated dispensing of these items.

Furthermore, the invention relates to an apparatus that makes possible the automated reception, storage and dispensing of items and/or item consignments in different sizes and formats taking into account the greatest possible efficiency regarding the workload and the storage capacities, the integration rate and the rate of removal from the warehouse, the flexibility between the entry and the discharge of the items and/or item consignments relative to the expense.

Previous technologies are characterized in that a handling system "grasps" or "lifts" items and or item consignments upon storing in different ways and then transports them to the predetermined storage location and "deposits" them there again. During the removal from the warehouse the handling system then travels back to the location where the items and/or item consignments are located, "grasps" them again or attracts them by suction, "raises" them and transports them back to the location at which the further discharge takes place and "places" or "sets" them down there again.

At the present time different grasping techniques are used for this such as, e.g., pneumatically or mechanically driven pincers or tools that operate by vacuum techniques such as, e.g., suction plates.

The task is solved according to the invention by a warehouse in that the means for storing the items comprises a handling system with a warehouse robot as well as a storage system in the form of a shelf system, and that the warehouse comprises storage areas with different air-conditioning zones and at least one air-conditioning device for regulating the temperature and/or the air humidity of the air-conditioning zones in which the items are stored according to their individual identification, and that the items are supplied by the automated dispensing to a discharge station after the inputting or detection of the individual identification associated with the item and/or the actors.

Alternatively, the invention relates to a warehouse for handling and/or distributing items, comprising
 means for receiving items from at least one supplier
 means for storing the items, and
 means for the automated dispensing of the items to at least one taker or customer.

Such a warehouse is characterized in that the means for receiving the items automatically detects an individual identification of the items and/or generates an individual identification, as a result of which an association of the items to one of the takers takes place, that the items are stored by a handling system in the warehouse according to their individual identification, and that the items associated with one of the takers are supplied to a discharge station by the automated dispensing after the inputting or detection of the individual identification.

A preferred embodiment is characterized in that the means for the automated receiving comprises a means for detecting the individual identification of the items such as a scanning system or a means for the manual or electronic inputting of the individual identification such as a keyboard or touchscreen.

The warehouse preferably comprises for the automated receiving and/or automated dispensing of the items at least one input/output shaft or alternatively at least one output shaft and at least one input shaft and/or an input/output shaft.

It is preferably provided for the storage of different items that the warehouse comprises storage areas with different air-conditioning zones and at least one air conditioning apparatus for regulating the temperature and the air humidity of the air-conditioning zones.

A preferred embodiment is characterized in that the handling system and/or the warehouse comprises means for receiving payments and/or barcodes.

Furthermore, the warehouse and/or handling system can be connected by a communication interface to a data network such as the Internet in order to receive orders from actors and retrieve information about the stored items.

The handling system preferably comprises a handling system in the form of a warehouse robot as well as a storage system in the form of a shelf system for the depositing of the items, wherein the storage of the items preferably takes place without them being associated with each other.

A further development of the invention provides that the warehouse robot comprises a receiving unit/distribution unit, with a transport surface and a pushing means with which the items can be pushed onto or drawn off of the transport surface. In this embodiment the items and/or item consignments are not stored in, transferred in and removed from the warehouse by lifting and deposition but rather are stored in, transferred in and removed from the warehouse by a pushing means such as a pusher or a comparable device.

The pushing means can be pushed with a drive such as a linear drive in an X-Y plane and is preferably supported so that it can rotate about a Z axis. The movement of the pushing means takes place via a linear drive that preferably comprises two longitudinal rails that run parallel to or substantially parallel to longitudinal edges of the support surface and comprises a transverse rail that is movably supported on the longitudinal rails. The pushing means is preferably constructed in a T-shape, wherein a first shank is connected to the transverse rail and is supported on the latter in such a manner that it can rotate in the longitudinal and in the transverse direction and around the Z axis. A second shank runs parallel or substantially parallel to a transversely running edge of the transport surface and comprises a pushing surface which rests on the item when pushing or pulling it.

Another preferred embodiment provides that the pushing means is moved by an articulated arm. The articulated arm can be arranged on a longitudinal rail running parallel or substantially parallel to a longitudinal edge of the transport surface. The articulated arm itself is connected by an articulation to the longitudinal rail and the pushing means is rotatably arranged on the articulated arm in such a manner that it can be pushed.

The items can be received and discharged on both sides of the transport surface by the pushing means.

It is furthermore provided that the receiving unit/discharge unit can be moved in a Y-Z plane by a rail system. The receiving unit/discharge unit can preferably move in an intermediate space formed between shelves, wherein the intermediate space has a width corresponding to the width of the transport surface so that items can be entered into and moved out of shelf compartments of adjacent shelves by pushing.

The pushing means and/or the receiving unit/discharge unit can preferably be adjusted in height and/or can be inclined by an articulated arm or in linear technique in an X-Y plane or a Y-Z plane in order to be able to move different formats.

Another preferred embodiment is characterized in that the pushing means comprises a suction element with which the item or an item consignment can be fixed during the pushing or during the pulling.

Furthermore, the invention is characterized in that the transport surface, which transports the item and/or the item consignment, is equipped with at least one suction device such as a vacuum suction device with which the item and/or the item consignment is fixed during transportation.

It can also be provided that the transport surface can be adjusted in its inclination in the direction of the adjacent shelves in order to make it possible that items slide from the transport surface into a compartment.

An optimal workload of the storage space is achieved by the measures of the invention. In the previous prior art and in the case of different item formats this was only possible with expensive grasping techniques or by very high technical expense which arose due to the fact that during the depositing of the items mechanically operated drawer systems are used onto which the items are then deposited.

Furthermore, a rapid reception, storage and subsequent removal from storage are achieved since the item is fixed during the transport by the pushing means and/or the transport surface.

As a result, very rapid movements, in particular accelerations of the receiving unit/discharging unit are made possible. As a consequence, synergistic effects can be utilized which are produced in that in the case in which several items and/or item consignments which are located at different storage sites or are to be brought to these sites can be transported to them without a number of grasping or fixing tools corresponding to the items and/or item consignments being required.

Since the handling system of the present invention is separated by a lock from the person presenting the items, the advantage is achieved that the items do not have to be manually fixed correctly into a grasping system. As a result, it is not necessary that the handling system must precisely adjust to a position by an expensive technique, so that additional alignment units can be eliminated.

Furthermore, the invention solves the problem that in the case that a single receiving-/discharge apparatus a prioritizing conflict between the input procedure and the removal from storage procedure does not arise.

Other details, advantages and features of the invention result not only from the claims, the features to be gathered from them—alone and/or in combination—but also from the following description of a preferred exemplary embodiment shown in the drawings.

Figure 2:
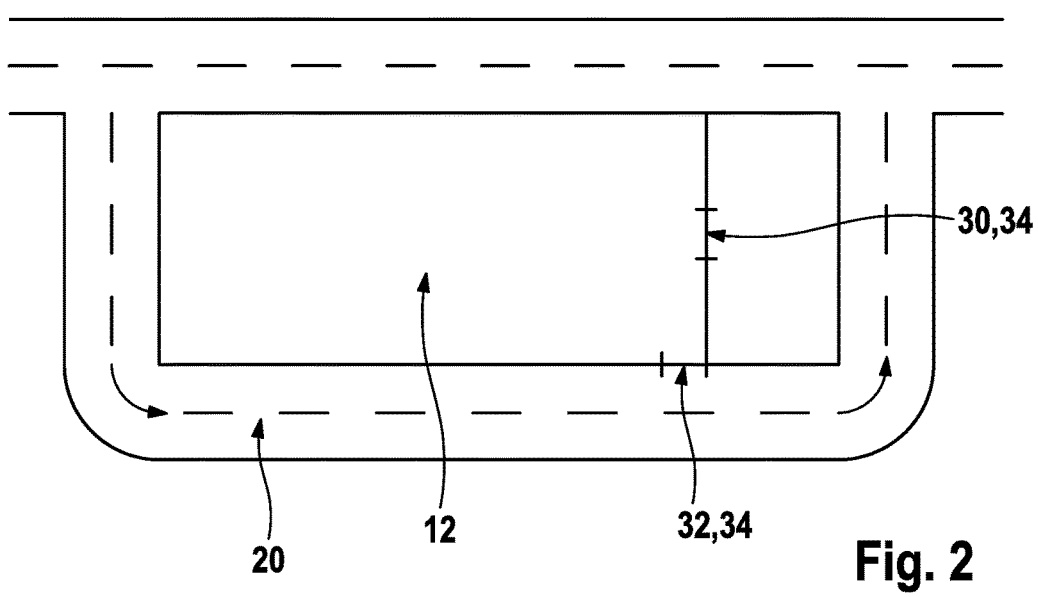
Figure 3A:
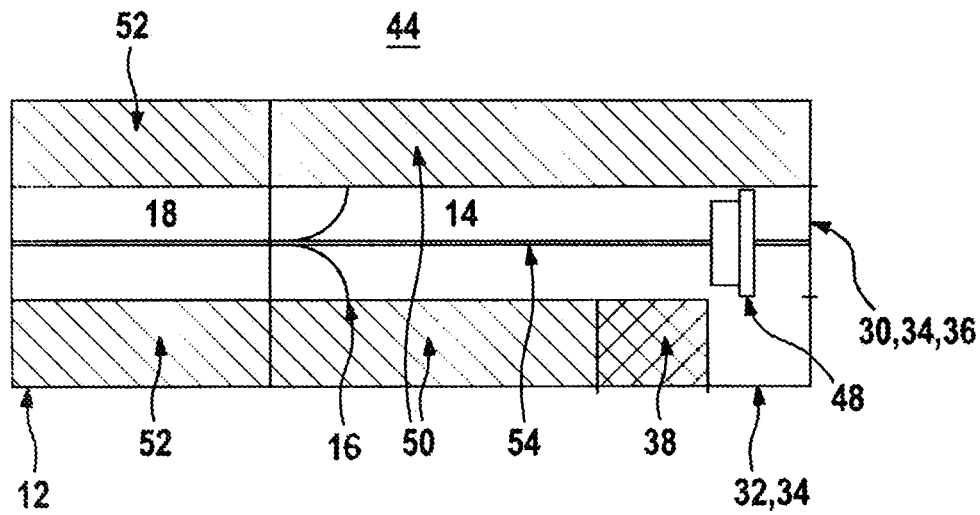
Figure 4:
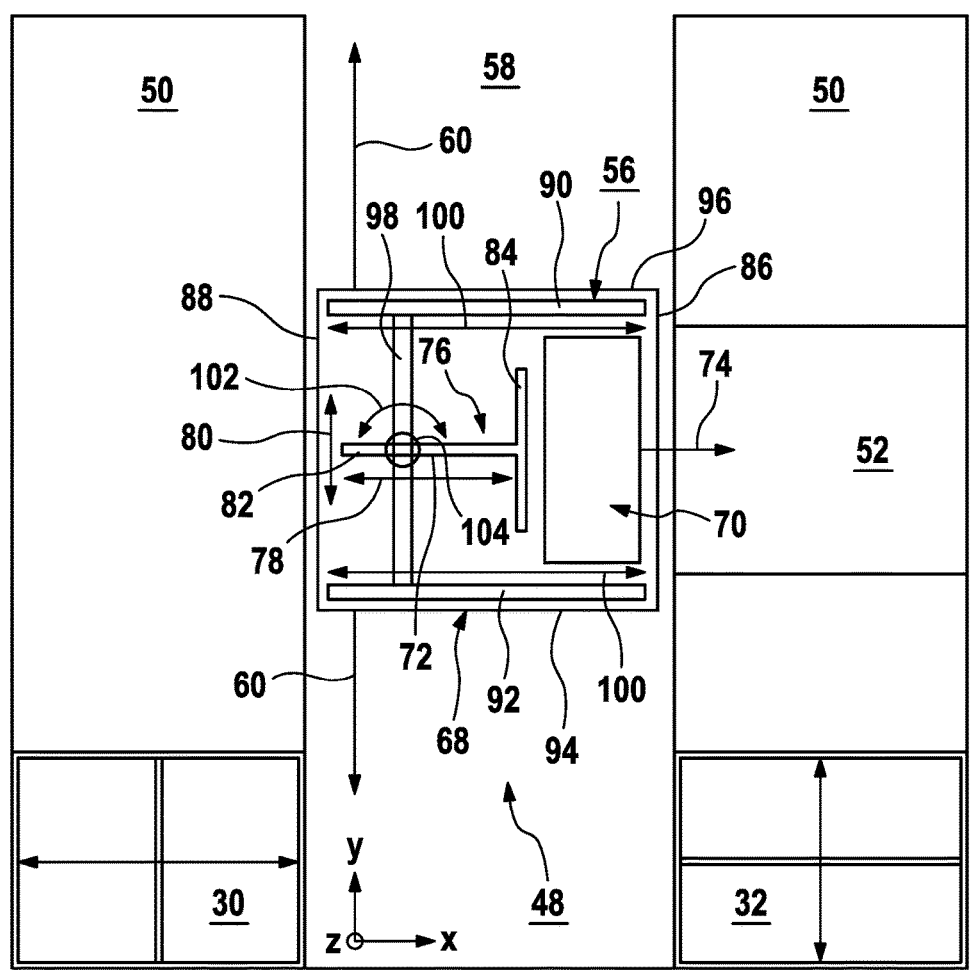
Figure 5:
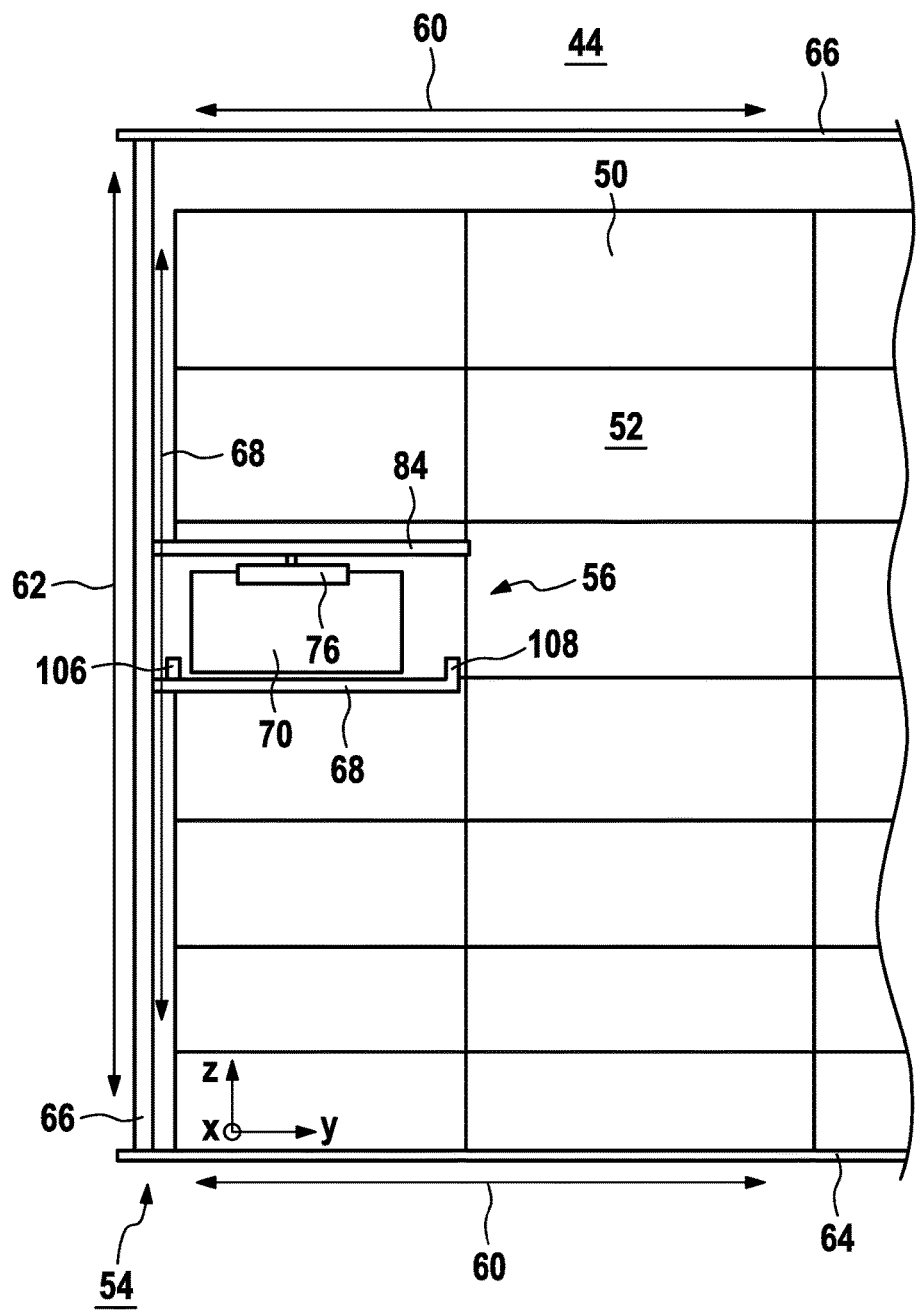
Figure 7:
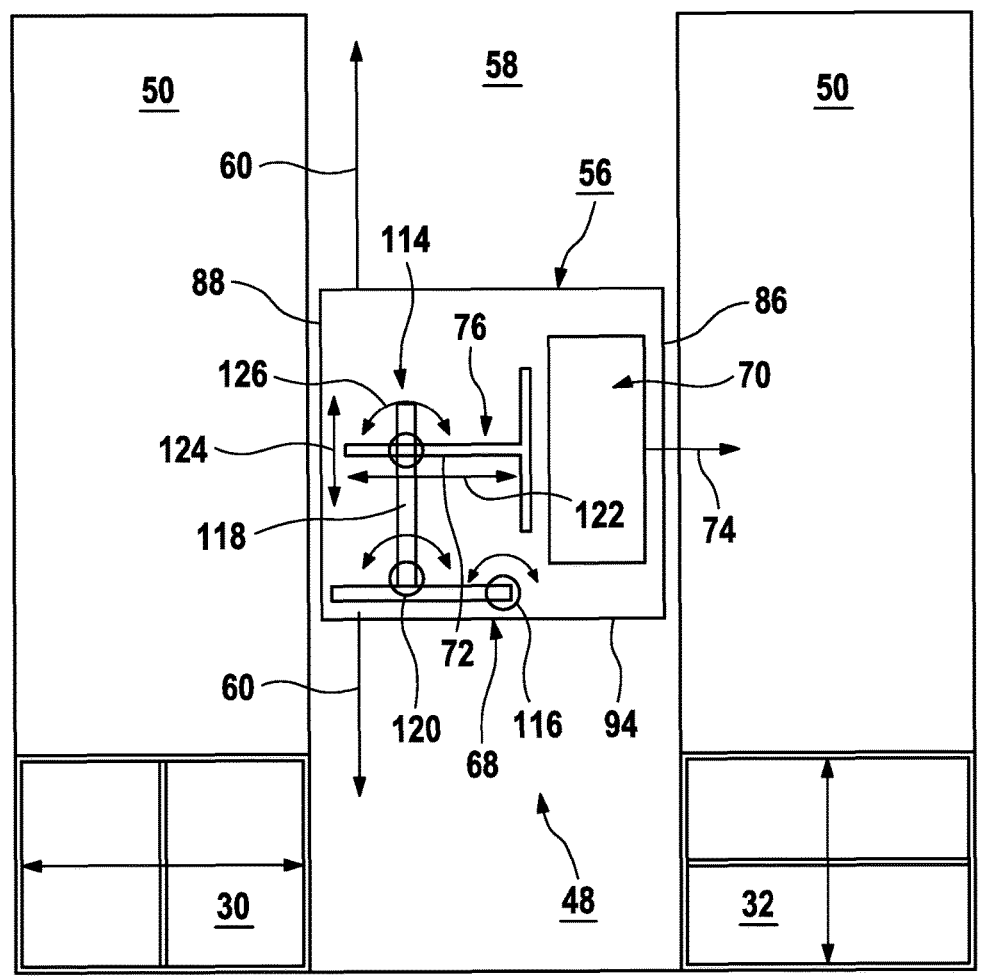

In the drawings:

FIG. 1 Shows a schematic view of the warehouse,

FIG. 2 Shows a top view of the warehouse with an area for cars and traffic, and FIG. 3a, b Show a schematic top and side view of the warehouse and of a handling system of the warehouse, FIG. 4 Shows a top view onto a receiving/discharge apparatus of the handling system, FIG. 5 Shows a side view of the receiving/discharge apparatus of the handling system, FIG. 6a, b A top view and a side view of a pushing means of the receiving/discharge apparatus, and FIG. 7 A top view of a second embodiment of a receiving/discharge apparatus.

1. Philosophy of the invention
2.1 Construction and technical equipment of the warehouse
   2.1.1 Description of the construction
   2.1.2 Sketch of a construction example FIG. 1+2 see page 40+41 and description FIG. 1+2 legend for the drawings page 39
2.2 Air conditioning
   2.2.1 Temperature control
   2.2.2 Air humidity control
   2.2.3 Temperature monitoring with warning function
2.3 Input-and-discharge shaft for items
   2.3.1 Display for operating the warehouse
   2.3.2 Fingerprint sensors
   2.3.3 Scanner for reading EAN and QR codes
   2.3.4 Customer card reading function
   2.3.5 Checkout function
   2.3.6 Documentation printer
   2.3.7 Primary/secondary SD
2.4 The storage system
   2.4.1 Sketch construction example FIG. 3 page 42
   2.4.2 The shelf system
   2.4.3 The warehouse robot
   2.4.4 The packaging 2.5 Internal hardware
  2.5.1 Computer
  2.5.2 Server
2.6 Monitoring cameras
2.7 Current meter
2.8 Internet connection
2.9 Emergency current supply
3. External hardware
  3.1 Consignment terminal stationary
  3.2 Consignment terminal mobile
  3.3 Stationary fingerprint reading device
  3.4 Device with installed application for mobile communication with the warehouse
4. Software:
  4.1 Software functions for the consumer
    4.1.1 Home page "www.gourmetwarehouse.de"
    4.1.2 SD marketplace of each warehouse
      4.1.2.1 The purchase in the SD online shop of an actor
        A) Individual order
        B) Purchase from the storage refrigerator or storage freezer of the actor
      4.1.2.2 SD market hall
      4.1.2.3 SD Order just in sequence delivery and take off
      4.1.2.4 SD discount shop
  4.2 Assignment of the customer numbers
    4.2.1 SD basic customer data
  4.3 Consumer account
    4.3.1 Consumer balance
    4.3.2 Family account
    4.3.3 Forgotten package reminder
    4.3.4 SD order track
    4.3.5 SD collecting orders:
    4.3.6 Item information app
Software for the connected actor
4.4 Warehouse manager—general warehouse manager
  4.4.1 SD DM distributor
  4.4.2 SD DM chat function
4.5 Actors' account
  4.5.1 Customer list with clarification of the credit line
  4.5.2 Online shop of the actor
  4.5.3 SD production assistant
  4.5.4 SD slot calculator
  4.5.5 SD consignment
  4.5.6 SD MHD reminder and storage assistant
  4.5.7 SD paper-case:
  4.5.8 SD flyer-store:
  4.5.9 SD slot share n' trade
  4.5.10 SD interfaces
  4.5.11 SD finance
    4.5.11.1 Operating cost computer with splitting function:
    4.5.11.2 Cash money:
    4.5.11.3 Actor debts:
      4.5.11.3.1 Open posts list:
    4.5.11.4 SD balance:
    4.5.11.5 SD finance professional:
      4.5.11.5.1 Cash money pro:
      4.5.11.5.2 SD debt collection
      4.5.11.5.3 SD debt collection pro:
  4.6 Warning and emergency procedures
    4.6.1 Voltage loss
    4.6.2 Temperature fluctuations outside of previously define norm
    4.6.3 General malfunctions
5. Daniel's Gourmet Premium Marketplace
6. Daniel's Gourmet Premium Marketplace Deluxe 1.1 Philosophy of the Warehouse:

The warehouse, called "Daniel's Gourmet Premium Marketplace", "warehouse" or "SD" in the following, is a fully automated "mobile" technical apparatus that offers in an online e-marketplace to one or more connected, business actors, called actor/s in the following the possibility, by its construction and equipment in the form of hardware and software and its bidirectional interface with online capability, and by the independent using of previously defined algorithms, of presenting their business and/or their items, offering groceries or general items there and also directly in the SD, assuming orders for the actors that it forwards to them, commissioned by the latter, it conducts business with the items present in the warehouse, it assumes consignments for items with an integrated, fully automated warehouse robot, deposits them in the integrated storage shelf system in a plus temperature area as well as in a minus temperature area, it stores temperature-sensitive items properly in accordance with EU and HACCP hygienic guidelines, can independently carry out administrative and logistic tasks such as those pertaining to storage maintenance, documentation, bookkeeping, commerce and debit entry between a connected actor and a consumer, called "consumer" in the following as well as between connected actors among themselves, it makes current applications available for the communication and control of the warehouse for the actors as well as the consumers, it carries out tasks of payment transactions in cash as well as those that take place electronically between B2C (Business to Consumer) as well as between B2B (Business to Business) upon request for them, and after the consumer has achieved authority for the items in various ways it delivers them after the release by the connected actor to the consumer or to another person defined by the connected actor.

This requires a broad, qualitatively high-grade offer of items, a comfortable and clear ordering process, a simple verification in the SD and a rapid, uncomplicated payment and issuance of the items which the customer receives in a high-grade cardboard or packaging so that he can see even here that he is receiving this quality as a customer of the "Daniels Gourmet Marketplace".

The SD actor meets these modern-day demands with the offer of the SD. A cornerstone of the philosophy of the SD is the sustainable managing of resources!

Resources such as:
A) Food

When buying in the SD, the sustainable process ensures that in spite of the fact that a broad offer is made possible, an overproduction is reduced to a minimum by the intelligent planning and sale of the food.

B) Energy

The sustainability is described and met with the energy in the SD on the one hand by the coming together of very different items, different suppliers at one point, the collective delivery of them for several customers by the individual actor at this point and the use of intelligent applications such as described, e.g. at point 4.5.9 SD slot share n' trade, by increased efficiency and by the savings of electricity as well as of fuels such as gasoline or diesel fuel.

Another resource that is becoming more and more important for the future and for the modern SD customer is the "time" resource.

C) Time

The sustainability is met with time in the SD with the thoughtful use of different tools such as, e.g. efficiently designed consignment processes by the actor, by making it possible to order at any time 365 days a year by the customer, but also, as concerns, e.g. point 4.1.2.3 "SD Order Just in Sequence Delivery and Take Off" by synchronized, interlocking processes between actor and customer.

2. Construction and Technical Equipment of the Warehouse According to FIGS. 1 to 7

2.1 Description of the Construction

FIG. 1 shows a warehouse 10 constructed in a weatherproof manner for being set up outdoors. A basic framework of the warehouse consists of a steel skeleton in which insulated sandwich panels are constructed as wall covers and floor elements.

Figure 3B:
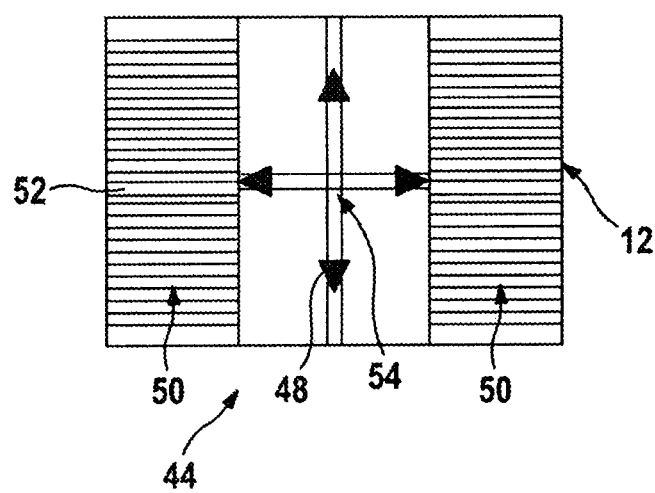

The warehouse 10 is constructed and used in different sizes and embodiments from the small mini-warehouse 10 according to FIG. 1 which can be reached by foot, e.g. at heavily frequented locations to the large warehouse 12 that optionally comprises, in addition to a refrigerating zone 14, a deep-freeze area 18 separated by a separation 16 (FIG. 3).

FIG. 2 shows the warehouse 12 in a "drive-through style" which can be reached for service from a car 20. The warehouse 10, 12 is constructed in a modular manner so that it can be expanded in accordance with the capacity required.

The roof and the walls of the warehouse serve as high-grade advertising surfaces for the gourmet warehouse.

2.2 Air Conditioning:

2.2.1 Temperature Regulation:

Since the warehouse 10, 12 is constructed for being set up outdoors, in order to be able to ensure the desired temperature in the apparatus the apparatus is equipped with an air conditioning system 22 that cools as well as heats.

2.2.2 Regulation of Air Humidity:

In order that the packagings do not suffer any damage due to high air humidity, a device 24 that regulates the air humidity is installed in the warehouse.

2.2.3 Temperature Monitoring with Warning Function:

A digital temperature recording device 26 with warning function is installed in the warehouse 10, 12 that permanently records the temperature course in the warehouse and in the case of a deviation of the actual value from the theoretical value it informs its actors online and/or by text message so that they can counteract this in order that losses due to spoilage of the items can be avoided.

2.3 Input-and-Discharge Shaft:

Depending on the size and the situation of the setup site of the warehouse, it is constructed and equipped with one or several input-and-discharge shafts 28 and/or additionally one input shaft 30 and/or one discharge shaft 32.

2.3.1 Display for the Operation of the Warehouse:

The operation of the warehouse 10, 12 takes place via an input means 34 which also meets the IP65 protection standard such as a touchscreen display. The display 32 is present at the in-and-discharge shaft 28 as well as at the input shaft 30 and at the discharge shaft 32.

2.3.2 Fingerprint Sensors:

An identification system 34 such as fingerprint sensors is optionally installed on the shafts 28, 30, 32 of the warehouse 10, 12 at which the user of the warehouse, on the part of the actors and also on the part of the consumer, is offered the possibility of verification by his own fingerprint in addition to the possibility of verification by inputting a pin, EC, credit or gourmet warehouse card.

2.3.3 Scanner for Reading EAN and QR Codes:

A detection system 36 such as a scanner is located at the input-output shaft 18 and at the input shaft 30 of the warehouse. It scans an individual identification such as a sending ID which is printed on a packet label of the item and forwards the information to a storage holding system 38.

2.3.4 Customer Card Reading Function:

as already described at point 2.3.2, the gourmet warehouse customer card is, in addition to other ones, a possibility for verifying the warehouse user, both by the consumer as also by the users on the part of the connected actors.

2.3.5 Checkout Function

A large part of the payment transactions of the Gourmet Warehouse are transacted online. However, in order to also ensure payment transactions directly with the warehouse 10, 12, each Gourmet Warehouse is provided with at least one payment terminal 40 at the in-and-discharge shaft 28 or a discharge shaft 32. Payments in cash as well as payments by debit cards such as, e.g. a post office card, electronic cash/cc cash, Maestro and V PAY and credit cards such as, e.g. MasterCard, Maestro, Visa or American Express are possible at the payment terminal.

The payment terminal 48 is integrated in or on the apparatus 10, 12 in such a manner that the removal of cash as well as the providing the terminal with change externally or by commissioned financial service providers or money transport companies is possible without them having to represent the warehouse itself.

2.3.6 Documentation Printer:

A printer 42 located directly at the discharge shaft 28, 32 prints receipts during the inputting of and discharge of shipments in the warehouse but also prints, if needed, bills of delivery and statements. The printer can also print an individual identification of an item generated by the warehouse.

2.3.7 Primary/Secondary SD:

If a company decides to become an actor of a Gourmet Warehouse, the first Gourmet Warehouse in which it becomes active is defined as its primary Gourmet Warehouse. Its main data such as, e.g. the online shop is put on the server of this warehouse. If it decides to become active as an actor for another or for several other warehouses, they are described chronologically in the sequence of their becoming active as its secondary warehouse's 1-x and are coupled to the primary warehouse of the actor.

2.4. Storage System:

FIGS. 3a and b show an embodiment of a storage system 44 comprising a handling system 46 with warehouse robot 48 and a shelf system 50 with compartments 52 in the form of slots.

2.4.1 The Shelf System:

Different sizes of the compartments 52 called "slots" in the following are constructed in the warehouse individually according to the size of the warehouse and as a function of the planned product range of items. It is possible for the system to also store rather small packets in larger slots temporarily, as long as the optimal slot is not available, by the structure of naming the individual slots in order to achieve an optimal utilization of the SD.

If the system stored a rather small packet in a larger slot, it recognizes as soon as the optimal slot becomes free and then transfers the packet over independently so that no space capacity is lost.

The storing in and out of the items is assumed by the handling system 46 with a completely automated warehouse robot 48 that is guided on a rail system 54. The warehouse robot 48 can receive packets with different sizes and shapes on the item in-and-out shaft 28, 30, independently store them in the slot given to it by the system, pick them up again on the command of the system and discharge them again at the discharge shaft 32.

FIGS. 4 and 5 show a top and a side view of an embodiment of the storage system 44 according to FIG. 3.

The warehouse robot 48 comprises a receiving/discharge unit 56 that is arranged so that it can travel along the rail system 54 in a Y-Z plane in an intermediate space 58 between the shelves 50 in the direction of the arrows 60, 62. The rail system 54 comprises horizontally running rails 64, 66 and vertically running rail 66 that extends between the horizontally running rails 64, 66 and is received in them at the end side in a movable manner. The receiving/discharging device 56 is arranged so that it can travel along the vertical rail 66 in a horizontal direction according to arrow 68 in order to be able to control the individual compartments 52 of the shelves 50.

FIG. 4 shows an embodiment of the receiving/discharging device, wherein it comprises a storage surface 68 onto which the items 70 are transported. The item 70 is movably arranged on the transport surface 68 so that can be pushed by a pushing means 76 in the direction of the outer 74 into a shelf compartment 52. The pushing means 76 is movably arranged in the direction of the arrows 78, 80, i.e. in the X-Y plane. The pushing means 76 is constructed in a T-shape and comprises a first shank 82 and the second shank 84 that is aligned substantially at a right angle to the first shank 82 and parallel to transverse edges 86, 88 of the transport surface 68.

A linear drive 89 comprises guide rails 90, 92 running parallel to or substantially parallel to longitudinal edges 94, 96 of the transport surface 68. A transverse rail 98 extends between the guide rails 90, 92 and can travel along the longitudinal rails 90, 92 in the direction of the arrow 100.

The pushing means 76 is supported by its first shank 82 in a movable manner on the transverse rail 98 and can travel in the direction of the arrows 78, 80. In addition, the shank 82 and therefore the pushing means 76 are rotatably supported in the direction of the arrow 102 about a shaft 104 running in the direction of the Z axis in order to make it possible that items 70 can be drawn in both directions onto the support surface and pushed from the transport surface into compartments 52.

A preferred embodiment provides that the transport surface is pivotably supported in the X-Z plane in order to make it possible that items 70 slide from the transport surface into a shelf compartment 52 and that the pushing process is supported.

FIG. 5 shows a side view of the receiving/discharging device 56, from which it can be gathered that the transport surface 68 comprises lateral limitations 106, 108 that extend in the longitudinal direction of the transport surface 68 so that they substantially form a U shape. The lateral limitations 106, 108 prevent the item 70 from becoming fixed on the transport surface 68 upon a movement of the receiving/discharging device in the Y-Z plane, in particular in an X-Y direction. As a result, very great accelerations of the receiving/discharging device 76 can be achieved.

FIG. 6a shows the pushing means 76 in a top view whereas FIG. 6b shows the pushing means 76 in a side view. The pushing means 76 comprises the longitudinal shank 82, which is movably and rotatably supported in the linear drive 89. The transverse shank 84 runs at a right angle to the longitudinal shank 82 and has a front surface 110 which rests against the item 70 when the item is being pushed.

In order to attract the item 70 the surface 110 can comprise suction means 112 such as a vacuum suction apparatus with which the item 70 is aspirated and can then be drawn onto the transport surface.

FIG. 7 shows a top view of a second embodiment of a receiving/discharging device, wherein the pushing means 76 is arranged on a grasping arm apparatus 114 which comprises a first arm 116 parallel or substantially parallel to the longitudinal edge 94 of the transport surface 68 and comprises a second arm 118 which is connected by an articulation 120 in an articulated manner to the first arm 116. The pushing means 76 can travel along the longitudinal rail 118 in the direction of the arrows 114, 122, 124 and is rotatably supported in the direction of the arrow 126 so that the elements 116, 118 in combination with the pushing means 76 form an articulated arm.

Consequently, the pushing means 76 can be controlled by the grasping arm apparatus 114 in such a manner that that the item 70 can be taken to the two longitudinal sides 86, 88 of the transport surface 68 and discharged.

The embodiment of the invention brings it about that the items 70 and/or item consignments do not have to be transported to the storage location by a complicated or expensive grasping technique but rather are pushed by the pushing means 76 such as a pusher to the reception and during the storing-in/storing-out process.

After the item 70 and/or item consignments determined for being stored in have been placed into the item entry lock 30, 32, which can also be designed at the same time as an item exit lock, the pushing means 76 draw the item 70 and/or the item consignment onto the transport surface 68, which is constructed in a U shape. The item 70 is fixed in such a manner that that it is fixed during the storing-in movement by lateral edges 106, 108 of the U-shaped transport surface 68. For the case in which the transport surface 68 is not constructed as a U shape, the limitations 106, 108 can also be constructed differently.

Once it arrives at the storage location, e.g., at compartment 52, the pushing means 76 pushes the item 70 from the transport surface 68 into the compartment 52 of the shelf 50.

During the discharge process the pushing means 76 draws the item 70 onto the transport surface 68 and places it on the opposite limitation, which can also be constructed with a U shape. The item 70 is then transported to the item discharge lock and/or item entry lock 30, 32 where the item 70 can be pushed out by the pushing means 76 into the lock 30, 32, which can also comprise a conveyor belt.

The pushing means 76, which draws or pushes the item 70, can be constructed in different ways, for example, by shafts or rails 98, 100 or 116, 118 constructed in the form of linear drives 84 and 114, or are driven and controlled by an articulated robotic arm.

The storage system 44 can be constructed with a lock 30, 32, which can either be an entry lock or a discharge lock, and can also be constructed with at least one or several separate entry locks and one or more separate discharge locks.

The described invention makes it possible that item 70 and/or item consignments for different sizes and weights can be stored in and out very rapidly by using very economical technical means.

Moreover, it is achieved with very little technical expense that as a consequence of the fact that items 70 or item consignments of different size are not grasped or must be attracted by vacuum, technically expensive drawer systems can be eliminated and at the same time a very high utilization of the storage space is achieved.

If the storage system is constructed not only with a lock that serves at the same time as in in-and-out lock but is constructed and equipped with at least one or more input storage locks or one or more outlet locks, the advantage is achieved that the handling unit can be active for the item receiver and/or item consignment receiver and at the same time items and/or item consignments can be entered into the system through the separate item input locks which the handling unit then transports at a later time to the storage location.

2.4.4 Packaging:

In order to achieve a problem-free operation of the warehouse robot it is preferably necessary that all items or articles and consignments stored in the warehouse 10, 12 are packaged in folded cardboard.

It is advisable for hygienic reasons that the item in the folded cardboard is additionally packaged fused in sealed shells or film bags. In this manner the transfer of odor and taste of various items such as, e.g. fish, cheese, meat and fine bakery products is excluded, which makes it possible for the SD to therefore offer a very great number of products.

2.5 Internal Hardware:

2.5.1 Computers

The computing power is taken over per warehouse 10 preferably by two computers 128 such as industrial PCs in accordance with the IP65 protection standard. A first PC performs the required computer work and on a second PC all computing processes for the securing of data are stored in a mirrored manner. If the first PC breaks down, the second PC then assumes the computer work.

2.5.2 Server:

Two IP65-protected servers 56 are installed per warehouse as was the case for the computers. One server that can access the various systems and one server on which the data is available in a mirrored manner which in the case of a server problem assumes its work.

2.6 Monitoring Cameras:

In order to prevent the danger of vandalism the warehouse is optionally watched by video at various locations around and inside the warehouse.

2.7 Current Meter:

The SD is selectively equipped with its own current meter in order to ensure a precise invoicing of the operating costs of the SD in case of a current connection which is not its own or a using by several actors.

2.8 Internet Connection:

Depending on in which region the SD is used, different data transfer rates are available, as is to be expected.

In order to ensure a smooth operation of the SD, it is selectively equipped with a permanent telephone connection and/or a radio connection for connecting the SD to the Internet.

2.9 Emergency Current Supply:

In order to avoid as best as possible damage to be expected due to a loss of voltage, the SD is equipped with constantly charged emergency batteries. Their capacity is designed to A) make possible emergency procedures as described in point 4.6.1, and B) to maintain the refrigerating function of the SD as long as possible.

3. External Hardware:

3.1 Stationary Consignment Terminal:

A data interface which is adapted for market-leading sellers such as, e.g. Bizerba, Mettler Toledo or Berkel is installed in the warehouse software in order to possibly be able to use already present hardware belonging to the company such as, e.g. modern loading balances and inter-linked checkout systems in accordance with an independent concept of the invention.

The complete consignment terminal consists, if there is no partially compatible hardware for the consignment present, of an operating display with connected or integrated, Internet-capable PC, a balance connected to the PC, a printer on which delivery notes are printed and a label writer on which codes for the shipment are printed, as a function of the product range of the actor.

Depending on the planned setup location the consignment terminal is also offered and delivered in a construction in accordance with IP-65 suitable for wetting rooms and freezer rooms.

3.2 Mobile Consignment Terminal:

The mobile consignment terminal is identical in its functions with those of the stationary terminal, see pos. 3.1; however, all components are present here in a transportable housing. The components are also optionally in a design protected by IP 65 and obtainable equipped with mobile Internet access.

Such a terminal could be interesting for actors that would like to prepare mobile items for a later delivery to the warehouse, for example, parallel to the weekly market business or to a house-to-house delivery business.

3.3 Stationary Fingerprint Reading Device:

If the actor decides to offer his customers the possibility of verification, it is possible, not only in the warehouse but also in accordance with the invention also in the main store or in a branch, to scan and store in the system the fingerprint of persons who would like to be verified without complications in the warehouse.

3.4 a Device with Installed Application for Mobile Communication with the Warehouse.

Internet-capable: mobile data protection device in MDE, tablet PC or smart phone with which the actor is able at all times to communicate in a mobile manner with the warehouse.

4. Software:

4.1 Software Functions for the Consumer:

An invention with independent nature refers to a distribution system with warehouse.

4.1.1 Home Page www.Gourmetwarehouse.de:

The purpose of this home page is that the customer can find information about the functions of the SD and the SD or SD's that he can reach and use.

Once he arrives at this home page, he meets Daniel.

In distinction to customary home pages, it is planned here that the customer can read his information but can also find out about the possibilities offered to him by the SD by an animated figure, depending on the data transmission rate available, similar to a modern video game.

The customer has the possibility of finding the gourmet warehouse that is the closest for him via the SD finder. This takes place via the map view as well as via the search according to zip codes and via the surrounding area search.

4.1.2 SD Marketplace of Each Warehouse:

If he now calls the warehouse he goes directly to the warehouse's own server!

The warehouse is mobilely self-sufficient and can be used at other locations without an external server!

On the home page of the SD the customer arrives at the virtual marketplace in accordance with the data transfer volume and the desire of the actor.

The SD is designed in such a manner that that not only one actor but also several actors offer use.

The customer now has the possibility of opening the online shop of a connected actor or the SD market hall (see point 4.1.2.2).

4.1.2.1 The Shopping in the SD Online Shop of an Actor:

The customer now has the possibility in the online shop of the actor of

A) making an individual order, or

B) activating a purchase from the storage refrigerator or the freezer of the actor.

A)

Individual Order:

The actor has the possibility here via a bidirectional interface of coupling a databank of his inventory to the online shop in order to be able to offer the customer items in a binding manner, or he has the possibility, without using this function, of offering items to the customer according to their availability in a non-binding manner. In this case he can give the customer the possibility of alternatives for the case that a desired article such as, e.g. a certain meat cut is not available but a comparable product is available, however, from the butcher.

However, the customer can decide in the case that one or more articles of the order made by him cannot be delivered that the remaining order remains valid or should be canceled with notice.

Since particularly in the area of meat and sausage consignments are concerned that are freshly weighed, the customer has the possibility of giving the actor a range of decision-making in order to allow him, e.g. to make a 10-15% increase in the delivery amount without an extra confirmation.

Delivery Options of the Individual Order:

The actor determines which of the possible delivery variants he offers:
1. Shipment by mail or shipping company
2. Pick up in the main business or in a branch
3. Delivery of the shipment by a home delivery service belonging to the company
4. Delivery of the shipment to a gourmet warehouse.

In variants 2 and 3 the actor has the possibility, after the previous release by the client, of depositing the items shipment in a gourmet warehouse as an alternative for the customer, whose item shipment was not picked up during business hours by the customer in the case of 2. or in the case of 3. the client was not at home.

In this case the MDE (Mobile Data Detection Device, see point 3.4) is used perhaps for No. 2 but is used for No. 3.

If the shipment does not reach its receiver for, e.g. the above-cited reasons then the actor or the person authorized by him for the delivery can check an availability of the storage capacities operated by the actor and appropriate for the space requirement of the shipment with the MDE and the using of "4.5.4 SD slot calculator" in an SD operated by the actor and immediately reserve these capacities if available.

The MDE then generates a shipment access code for the case that the customer does not have his own consumer account, see point 5.

This shipment access code and the estimated arrival time of the shipment in the warehouse is sent to the customer selectively by SMS, email or post office box shipment.

The customer has the possibility with this access code or the consumer account at the points 2., 3. and 4. of receiving his item shipment in the SD.

B)

Purchase from the from the Storage Refrigerator or the Freezer"

This purchase concerns items that the actor has already determined and deposited in the warehouse for the direct sale to the end customer.

In distinction to the individual order, the customer also has the possibility here of selecting items in the SD from the items available in the SD, of buying them and of directly receiving them.

4.1.2.2 SD Market Hall:

In the SD market hall the customer has a total view over
A) All articles located in the warehouse, all actors that make offers from their storage refrigerators and/or storage freezers for direct sale.
B) All items that can be delivered by individual orders by the actors associated with the SD.

4.1.2.3 SD Order Just in Sequence Delivery and Take Off:

"SD order just in sequence delivery and takeoff" is the manner in which the binding purchase contract between customers and actors comes about after the inquiry of the customer about a precise delivery time and a binding confirmation of the same by the actor.

Depending on the AGBs of the actor for this model, it is possible, e.g., that if the actor does not deliver on time, a certain monetary amount, a fixed amount or a percentage amount corresponding to the value of the order is credited to or paid to the customer, or if the customer does not pick up the delivery on time, it is charged to him entirely, only partially or also, due to disposal costs produced, with an additional charge after agreement, but the item comes back into the possession of the actor or remains in his possession and is available for him as described, e.g. in point 4.1.2.3 SD discount shop.

This procedure is interesting, e.g. for customers for which the SD is located on a stretch such as, e.g., the way to his home or to his work but they do not want to accept any waiting times at the warehouse.

Once the shipment reaches the warehouse the customer is informed by mail. If this takes place at the agreed-on time the item is charged. If the customer can pick it up he can sell if further on the free market with financial losses.

When this method is used it is recommended for reasons of anonymity and of data protection regarding the original customer to not attach the delivery notice or the invoice directly on the item consignment but rather to issue it by the document printer described at point 2.3.6 only upon pickup.

4.1.2.4 SD Discount Shop

Items are offered "reduced in price" or "free" in the SD discount shop which are qualitatively unobjectionable but are close to the expiration date for maximum shelf life (MHD).

They can be items from the storage refrigerator or storage freezer which were not sold but also individual orders which were sold but not picked up by their receiver and are not freed for further sale in the sense of the general business conditions, or consignments which were not delivered by the actor in accordance with the agreed-on time, see point 4.1.2.3, and which are now not being accepted by the customer.

4.2 Assignment of the Customer Numbers:

In order to make it possible to use certain functions the assignment of the customer numbers is assumed by the SD independently of which actor or actors associated with the SD a person might be a customer of.

4.2.1 SD Basic Customer Data:

In the basic data the customer indicates the desired address for invoicing, the delivery address in the case of using the home delivery service and any SDs accepted for alternative delivery if one or more other SDs are available in a certain area and if so, which prioritization in which sequence is desired, indicates his email address and the contact telephone number. A visiting card is prepared for the customer with this data with which, as soon as the customer would like to place an order with an actor, it is taken from his actor account.

4.3 Customer Account:

4.3.1 Customer balance:

In addition to the data that the customer made as basic customer data at 4.2.1, the customer will receive in the customer account a complete list of his purchase activities. He will receive a differentiated listing of all his purchased and already paid items as well as an exact listing of his still pending obligations.

4.3.2 Family and Care Account:

The family account in the gourmet warehouse.

Here, for example, married couples or life partners can use an account jointly. In addition, it is also possible here that a budget can be set up for their children or other third parties which can be, for example, godchildren or also people who have economic difficulties or are in difficult social circumstances which the account holder would like to take care of, and who would independently have access to this budget when making purchases in the SD.

The account chief can for every individual co-user of his account authorized by him on the one hand determine a very detailed budgeting, e.g. individual daily, weekly or monthly budgets that are added or dropped if underused and on the other hand, however, can also determine by blocking certain articles which items may be acquired independently by the co-user.

The co-user authorized by the account holder has, in the case that the account chief made a pre-selection of the items to be acquired by the co-user, only this offer visible in his personally usable SD applications. This is especially important when, e.g. parents would like to influence the nourishment of their children.

Therefore, children can then, e.g. independently make a selection about which school sandwiches they would like of pick up in the warehouse on the way to school, or which convenience article freshly prepared by an actor they would like to pick up in the SD after the school.

The account chief obtains, if desired, information about all events concerning his account.

With this function parents have, e.g. the possibility of making possible a qualitatively valuable, cashless supply of groceries even in their absence.

4.3.3 Forgotten Package Reminder:

Since no items whose expiration date was exceeded are allowed to be deposited in the gourmet warehouse for hygienic reasons, the customer will be explicitly informed by the 4.3.3 forgotten package reminder before the expiration of the MHD about this before the expiration of the expiration date of his purchased items that were, however, not yet received and are still deposited in the SD in order to protect him from the loss of these items.

4.3.4 SD Ordertrack

SD Ordertrack is an app that makes it possible for the customer to view the delivery status of his orders at any time.

4.3.5 SD Collecting Orders:

SD collecting orders is a function in which the customer can communicate to the actor that he is expecting even other orders from other actors at his planned item pickup time. The customer as well as the actors will receive in this case a listing of the current delivery statuses. It is conceivable to integrate an advertising function here in order to optimize the service for the consumer by an increased incentivizing among the actors.

4.3.6 Item Information App:

An application is made available for the customer from the SD in which he can determine in a purposeful manner about which items available in the warehouse he will receive information. Therefore, he will be immediately informed, e.g., if an actor stored for sale in the warehouse a certain article which had been previously marked by the customer.

The customer can be informed about individual articles, certain actors up to all articles of all connected actors of one or more SDs. Therefore, the customer avoids an undesired flood of information and can still find out about the availability of items that he previously put in his favorites list.

4.4 Warehouse Manager—General Warehouse Manager:

Every actor connected to an SD defines a contact person, called a "DM" or warehouse manager" in the following who is authorized to deal with the SD. The SD communicates continuously in a bidirectional manner with this DM.

The SD imparts to him in advance set information by SMS and/or email, grants him insight into the information set by the actor and carries out orders which it obtains from the DM.

A general warehouse manager, called the GDM in the following, is selected from all DMs for each SD. This GDM is provided by the actor with special competencies in contrast to the other DMs in order to make possible a smooth operation of the warehouse as the main contact person of the DM.

Any compensation for expenses to be agreed upon which is to be credited to the actor who appoints the GDM is automatically updated in the 4.5.11.1 operating expense computer with splitting function and updated into this calculation of these operating expenses.

4.4.1 SD DM Distributor:

The SD DM distributor is an email setting in the SD that simultaneous informs all DMs of an SD and the GDM together.

Therefore, they can all be informed rapidly about certain information such as, e.g. a relevant temperature fluctuation indicating a problem with the refrigerating of the SD.

4.4.2 SD DM Chat Function:

Each SD is provided with a chat function for the DMs and the GDM.

Similar to a meeting of market suppliers, any situations can be jointly discussed among the actors without them having to accept time-consuming meetings.

4.5 Actors' Account:

4.5.1 Customer List with Explanation of the Credit Line:

If a customer would like to register in the online shop of an actor as such in order to be able to activate an order, the actor will request basic SD customer data of his visiting card under 4.2.1. The actor now revocably determines in a manner that can be changed at any time whether and at which amount he will grant a credit line to the customer. The actor then sends this data to the SD again.

This is necessary in order that the SD has clear instructions regarding the release of the items during the placement of purchases of the customer in the 4.1.2.2 SD market hall or the 4.1.2.3 SD discount shop. If the actor does not give the customer a sufficient credit line, the customer cannot make any reservation of items when shopping in the SD market hall and the discount shop in advance and can only receive items against direct payment in cash or ecash in the warehouse.

4.5.2 Online Shop of the Actor

As already described at point "4.1.2.1 The purchase in the SD online shop of an actor", an interface is defined here with which it is possible to couple a databank to the shop in which databank the current storage inventory of the actor is described in order to be able to directly confirm item shipments to the consumer.

If this possibility is not utilized, the actor has the possibility of not confirming orders until after a check is made.

However, the online shop also gives the actor the possibility of defining for each article certain individual as well as total order amounts in conjunction with certain parameters. Therefore, the online shop can independently confirm item consignments which have not yet been produced but which the actor can produce by the delivery time.

Therefore, the online shop of a butcher's shop can confirm, e.g. wiener sausages for a customer, knowing that they are produced on Thursdays, in an amount limited by the set parameters for delivery on a Friday or later.

The sum of all ordered articles is automatically made available to the 4.5.3 SD production assistant and the individual orders are made available to the 4.5.4 SD slot calculator for further processing.

At the moment of the placing of the order or the confirmation of an individual order by the actor the system predicts two or three packaging variants for the item shipment, taking into account parameters such as the weight and the size set by the actor and which can be changed at any time by practical experience, at least one but possibly also two or three packaging variants of the item shipment even in a prioritized sequence. After inquiry in the 4.5.7 paper case about the availability of the calculated packaging materials the online shop makes an inquiry at 4.5.4 slot calculator about the availability of the storage capacities in the SD desired by the client or also in "the" gourmet warehouses" made available by the customer by his data in the basic SD data.

The order cannot be confirmed to the customer until a confirmation of storage by the SD slot calculator has taken place.

The confirmed and reserved packaging variant made available by the SD slot calculator is added to the order and serves later in practice as indicating the package during the consigning.

Furthermore, the system generates for each confirmed order a personal QR or EAN code which also accompanies the item until discharged with which the history of the consignment can be reproduced at any time.

4.5.3 SD Production Assistant

SD production assistant is an application which enormously simplifies the production planning for the actor after a previous learning phase by user-defined data.

The app permanently communicates with the 4.5.2 online shop of the actor as well as with the application 4.5.5 SD consignment.

It adds the ordered items into the production calculation and subtracts already consigned items. It offers the possibility of managing an item inventory databank whose data is also updated into the production calculation.

The actor has the possibility of displaying not only the total amounts of individual items still to be produced but to also do this in a step-by-step manner within individual production stages. For example, "1000 wieners still to be produced, 300 by 8/4/2013, 300 by 8/5/2013 and 400 by 8/6/2013.

This takes place not only in text but also if desired in visual form as a diagram.

The app automatically calculates, including formulations belonging to the company, the still-needed amounts of material necessary for the production of the items. This also takes place in relation to the deadlines at which the items are needed and can take place in text as well as in visual form.

There is also the possibility here of coupling a material databank in order to show the actor not only a listing of the required amounts of material for processing the ordered items but can also prepare a recommendation for purchasing materials for him with the required value and contents of the individual items.

4.5.4 SD Slot Calculator

The SD slot calculator organizes, plans and carries out a record of all SD slot matters of the primary as also of the secondary SDs of an actor. It permanently communicates with 4.5.2 online shop of the actor, 4.5.5 SD consignment, 4.5.6 SD MHD reminder storage assistant and 4.5.9 SD slot share 'n trade.

4.5.5 SD Consignment

The consignment software also communicates with different applications of the SD.

It receives its orders from the 4.5.2 online shop of the actor. The actor has the possibility of providing his item list with different characterizing numbers so that the consignment software can independently split orders and send them to different consignment terminals so that coworkers in different and also in the same departments can process common consignments simultaneously and even in a time-delayed manner which are then jointly moved out of the warehouse and can be given to the customer.

Thus, in the example of a butcher's shop a coworker can process all sausage components of all consignments while another coworker processes all meat components during, before or afterwards.

SD consignment takes the item ID code defined by the online shop and independently generates, if necessary, other ones which are then stored as belonging to the consignment.

SD consignment gives the coworker the previously calculated and therefore already reserved packages in the warehouse. If a suggested package or a package combination should turn out in practice not to be available for the order, then the coworker has the possibility of allowing other package variations to be checked during the consignment process by the 4.5.4 SD slot calculator and of changing them if possible.

4.5.5 SD commission reports used-up packages immediately to 4.5.7 SD paper case. There is the possibility of carrying out the arrangements in such a manner that 4.5.5 SD consignment either combines the consigned article items and a common delivery note at the end of the consignment procedure; however, the system can also split an order into a different delivery notes that belong together or are treated separately. This is in particular advantageous if an exact bookkeeping separation is desired or necessary between individual departments in the company of an actor.

The delivery note or notes can be only printed but can also be sent to the customer after the finishing of the consignment process by email.

If individual articles of an order should no longer be deliverable, then the system automatically sends a message to the customer so that he is informed and able to optionally order replacement early for the lacking items.

Nevertheless, the software places a bookmark here that is necessary for the function 4.3.4 SD Ordertrack for tracking the order.

4.5.6 SD MHD Reminder and Storage Assistant

Every item consignment receives a minimum expiration date which is a function of the article with the shortest expiration date in the consignment.

While the SD reminds the customer about his items as described at 4.3.3 Forgotten Package Reminder, in the SD MDH reminder and storage assistant the actor is made aware of the items still in the warehouse but shortly before the expiration date.

There is the possibility in the warehouse with a freezer variant that the storage robot moves articles, according to previously set method steps automatically or on the instruction of the DM, which articles were offered stored in the fresh product area into the freezer area.

Once this takes place, the SD MHD reminder and storage assistant orients itself to the new freezer MHD and automatically changes the status of the shipment in the online shop of the actor and in the market hall.

The actor permanently receives the possibility by the 4.5.6 SD MHD reminder and storage assistant of obtaining a report about the entire status of his SD activities—how high the item value is of his own items still in the warehouse? Which ones of them were already sold? Which ones are being freely offered? How high was or is the storage location workload?, etc.

4.5.7 SD Paper Case:

The actor has the possibility in his actor account on the server of the gourmet warehouse of designing the layout and the shaping of his packages according to his own wishes and ideas with the application SD paper case, called SDPC in the following.

He selects cardboard boxes that are optimal for him from a list of cardboard boxes or packagings of different sizes and formats receives the basic layout and the logo of the gourmet depot suggested, can change the layout, add his own texts, store the designs and templates there and, after the finishing of the layout, order the packagings directly from the manufacturer.

SDPC monitors the inventory of the packaging means.

SD paper case, as soon as a packaging is registered as used in the consignment procedure, transmits this information to the app and SDPC subtracts this packing item from the inventory.

The actor determines a minimum storage supply for each packing item as soon as he defines his first packaging inventory in the SDPC. If this supply is dropped below during the consignment procedure, the SDPC reports this to the DM and suggests ordering the particular packing item in an amount previously basically defined by the actor.

The DM has the possibility of changing or not changing the ordered amount, and if he corroborates the ordering suggestion of the app the packing items are automatically ordered from the manufacturer in accordance with the previously defined conditions.

The SDPC generates a shipment-specific QR or EAN code here which is shipped with the order to the manufacturer and accompanies it up to the receipt of the item in the company of the actor.

Once the item shipment reaches the company of the actor and the code is scanned on the consignment terminal, SDPC registers the type of the packing items and the number of them as inventory input and adds them in the particular inventory list of the individual packing item.

SDPC compares the consumption of the packing items in a manner appropriate to the period with that of the previous years and suggests, in the case that a generally elevated consumption is recorded but also if a temporarily increased greater consumption is to be expected by an increased requirement conditioned by the season, e.g. at Christmas, an increased order amount of the packing items to the DM.

4.5.8 SD Flyer Store

In a manner similar to the point described for the function of the warehouse paper case, the actor receives the possibility in the gourmet warehouse flyer store of invoking this program on the server of the gourmet warehouse in his actor's account and of using templates, designing advertising means such as flyers, brochures, placards, banners, etc. with his own texts as well as images and logos and of ordering them directly from the manufacturer.

4.5.9 Slot Share n' Trade

Each actor of a warehouse has the possibility of conducting trade with his storage resources.

Trade can take place in the "warehouse slot trade" among the actors of a warehouse who have declared themselves ready to trade, in the "global warehouse slot trade" but also among the actors of different warehouses.

Every actor who has declared himself ready to trade with his storage locations will flexibly determine how much of a percent of his "non-taken or reserved" storage places he will make available to the slot exchange, to the trade with storage locations" and under which conditions.

At the same time the actor will define according to which priorities the purchase of required storage capacities should proceed. Should free storage capacities be purchased in a purposeful manner by friendly actors? Does the purchase go according to the best price?, etc.

If SD slot share n/trade should not have any SD slots available that are open for being freely allocated to the market by the actors but it nevertheless recognizes free capacities with connected actors, then the system inquires via the DM of the actors which ones have free slot resources and allocates them according to a special release.

4.5.9 SD Slot share n' trade documents all movements and allocations of warehouse slots and establishes for every actor, according to previously set parameters in time for each of its trading actors, debts vis-à-vis other actors and forwards them for the purpose of processing to 4.5.11 SD Finance.

4.5.10 SD Interfaces

In the system of the SD interfaces are defined in an actor-specific manner at various points in particular to make possible the integration into existing operating systems and the utilization of them.

Therefore, e.g. company balances and item management systems as well as financial bookkeeping systems, abbreviated FiBu, can be connected to and used with the system of the SD.

4.5.11 SD Finance

All financial debts that arise in the framework of operating the SD are provided with a specific payment code for the purpose of classification.

4.5.11.1 Operating Costs Computer with Splitting Function:

All costs arising from the operation of the gourmet warehouse, leasing rates, financing, current costs, position location leasing, position location financing, maintenance costs, compensation for expenses of the GDM and the like are added up in this function and distributed onto the individual costs in accordance with a previously determined distribution key.

The debts arising as a result of the above as well as the account management are administered and realized by the GDM.

The GDM has the possibility in the case in which use is made of the function 4.5.11.5 SD Finance professional of transferring the arising debts to the latter automatically and to allow them to be realized by this function.

The connected actors are informed about the accounting and the account movements of this function in accordance with the setting of this function immediately after every account movement or at certain periodic intervals by the 4.4.1 SD DM distributor.

4.5.11.2 Cash Money:

The cash function at the payment terminal is carried out by the GDM or is automated by the function "4.5.11.5.1 Cash money pro".

If this function is not used, the GDM takes care of the inventory of cash flow as well as the received cash of the SD.

The system automatically transfers the finance distribution of the money to it and it brings about the distribution of the financial means according to this key.

4.5.11.3 Actor Debts:

The system prepares for the actor a list of all debts as well as the associated specific payment codes and the data relevant for the processing for the items delivered, which were also given to him by the SD.

4.5.11.3.1 Open Post List:

All debts of the actor which are defined by the system in the function 4.5.11.3 Actor debts are automatically inserted into his "open post list".

This open post list is managed by the actor or, however, when using the function 4.5.11.5 SD finance professional, by the latter and its affiliated functions.

4.5.11.4 SD Balance:

4.5.11 SD Balance communicates, as soon as asked by the actor, with 4.5.6 SD MHD Reminder and storage assistant in order to obtain a list of the existing item values of the actor in the warehouse and with all relevant functions of 4.5.12 SD Finance in order to obtain a list of the money flow, of the obligations and of the debts of the connected actor.

This list, which contains an inventory list at the same time, is made available to the actor for review.

Moreover, a data record with this information as content is generated in the previously defined format, e.g. DATEV, XML or CSV which can then be updated by the actor in his financial bookkeeping software.

4.5.11.5 SD Finance Professional:

4.5.11.5.1 Cash Money Pro:

This function takes care of the cash movements of the SD in a completely automated manner.

When using this function a contractual relationship is entered into with a cash service provider and with a general financial service provider. The cash service provider takes care of the change inventory of the SD according to previously agreed-on parameters, removes the received cash from the latter and pays it to a determined account of the financial service provider who then distributes it to the individual actors using the distribution key given to him by the system.

The data of the received payments relevant for the financial bookkeeping are automatically transmitted to the actor by the system and are updated into the function 4.5.11.4 SD Balance.

4.5.11.5.2 SD Debt Collection Procedure:

When using the function 4.5.11.5.2 SD Debt collection procedure the actor has the possibility of entering a business relationship with a financial service provider.

In this case all debts of the actor defined in point "4.5.11.3 Actor debts" and of the data relevant for their realization are transmitted to the financial service provider.

Depending on the contractual relationship between the actor and the financial service provider, the open debts of the connected SD actor are realized by this financial service provider according to one of the 4 possible forms of the activity of debt collection companies cited in the following.

1. Inclusion in the order (debt collection company acts in the name of and on for half of the purchaser)
2. Authorization of inclusion (as at 1.; the debt collection company is authorized to request payment in its own name)
3. Debt collection cession (transfer of the debt—§ 398 BGB—for the purpose of inclusion)
4. Complete transfer (debt purchase—transfer to debt collection company without earmarking).

By using this function the function 4.5.11.3.1 Open post list of the actor is maintained "with its exact status".

Therefore, e.g. after collection of the debt in the Open post list it is registered as a conditionally received payment and after expiration of the retrieval period of the customer it is registered as a received payment and then credited to the actor, appropriately entered into the bookkeeping and the data transferred to the function 4.5.11.4 SD Balance and updated in it.

4.5.11.5.3 SD Debt Collection Pro:

"4.5.11.5.2 SD Debt collection pro" is a function of the professional management of debts.

The actor has the possibility here of entering into a business relationship with an attorney in an uncomplicated manner in order to rapidly and effectively realize overdue debts.

For the case that debts of the actor previously proved to be not realizable, the actor is make aware of them by the system. If the actor decides to have an attorney collect overdue debts, all data necessary for the realization will be automatically made available to the commissioned office.

The result of this procedure is automatically made available to 4.5.11.4 SD Balance for business evaluation.

4.6 Warning and Emergency Procedures:

4.6.1 Voltage Loss:

If the SD loses the voltage supply, the warehouse managers of the connected actors are immediately informed by Sms and/or email in accordance with the defined emergency algorithm plan.

At the same time hardware and software damage is prevented as well as possible by a "dasi" (data protection) initiated in case of a voltage loss and by an "SD start regulation after voltage loss".

Moreover, the SD will continue to supply the monitoring cameras with voltage from the emergency current reserve and will automatically send the images of the previously determined time period still in the memory as well as the images produced during the voltage loss.

4.6.2 Temperature Variations Outside of the Previously Defined Standard

If the digital temperature recording device as described in point 2.2.3 registers a relevant desired temperature range defined in advance, all DM's will be informed immediately by the SD DM so that they can react as rapidly as possible.

4.6.3 General Disturbances:

In the case of general disturbances of any type the previously defined DM's of the connected actors are informed by SMS and/or email so that the disturbance can be eliminated as rapidly as possible by their becoming active.

5. Daniel's Gourmet Warehouse Premium Marketplace

In the optionally available function "Daniel's Gourmet Warehouse Premium Marketplace" the actor offers the customer a new online shopping experience by the software which makes the purchasing as real as possible as in a real marketplace or store by 3-D graphics.

The customer has the possibility as in a videogame to go through the marketplace and to enter the particular stores, which also optically recreate the original stores, or the market hall.

In the online shop itself the design of the stores and phase as well as the service by the personnel recreates reality.

6. Daniel's Gourmet Warehouse Premium Marketplace Deluxe

In this function there is the possibility, in addition to the functions defined in point 6, of setting up a chat area. Therefore, customers can meet with other customers when shopping in the Gourmet Warehouse Marketplace and, e.g., talk about their purchases and exchange buying recommendations with each other.

The invention claimed is:

1. A method for the handling and/or marketing of items that are stored in a warehouse by at least one first actor, and are removed from the warehouse by at least one second actor;
   wherein an individual identification is detected, inputted, or generated by the warehouse upon an automated receiving of the items by the warehouse, the identification information including individual item-specific and/or actor-specific identification;
   wherein the items are associated with one of the actors by assigning the individual identification to one of the actors, and the items are stored based on the association with one of the actors in the warehouse; and
   the items are supplied to a discharge after the inputting of the individual identification by one of the actors, or
   the items are supplied to a discharge after the detection of the individual item-specific and/or actor-specific identification;
   wherein the individual identification contains information about the recommended storage conditions of the item, the storage conditions including the temperature of a refrigerating zone and a deep-freeze zone of the warehouse, or an expiration date of the item;
   the items that have been delivered to the warehouse are automatically received by a handling system through an input/output shaft;
   the items are stored by means of the handling system according to the individual identification based on the storage conditions in a shelf system located in the refrigerating zone, or the deep-freeze zone of the warehouse; and
   items which are temperature-sensitive are restored in accordance with the storage conditions by means of the handling system from the refrigerating zone into the deep-freeze zone, or are automatically supplied by means of the input/output shaft.

2. The method according to claim 1,
   wherein the individual identification is detected by scanning the item, or by a coding associated with the item, said coding including EAN code or QR code; or
   the individual identification is detected by an input of the first actor, wherein:
   the individual identification is generated by outputting a document, or a visual display in the warehouse, or on an external device, said external device including a mobile data device or personal computer; and
   the individual identification is transmitted to the second actor.

3. The method according to claim 1, wherein the items associated with the second actor are stored in the warehouse without being associated with other items of the second actor, and the items are automatically supplied to the input/output shaft after the input of the individual identification by the handling system, said second actor is a taker or customer.

4. The method according to claim 1, wherein the second actor orders items from a different first actor, the items are associated individually with the second actor, and the items are stored in the warehouse and transferred to the second actor from the warehouse.

5. The method for handling items according to claim 1, wherein the items are groceries, and said items are stored according to their individual identification at different temperatures.

6. The method for handling items according to claim 1, wherein an identification of the second actor is performed by an identification system, said identification system being a touch screen display, fingerprint sensor, card reader, and/or scanner; and
   wherein, upon an agreement of the identification with the individual identification, a discharge of the taker-specific or customer-specific item takes place.

7. A warehouse for handling and/or marketing of items comprising:
   a means for automatically receiving items from at least one actor;
   a means for storing the items; and
   a means for automatically dispensing of the items to at least one second actor;
   wherein the means for automatically receiving the items detects an individual identification associated with the items;
   wherein the warehouse optionally includes the actors generating an individual identification for the items, the individual identification is an item-specific and/or actor-specific identification;
   wherein the means for storing the items comprises:
   a handling system including a warehouse robot;
   a storage system in the form of a shelf system, the warehouse further including:
   the storage system comprising storage areas with different air-conditioning zones;
   the storage areas including a refrigerating zone and a deep-freeze zone; and
   at least one air conditioning apparatus for regulating the temperature and the air humidity of the air-conditioning zones;
   wherein the items are stored in the refrigerating zone, or the deep-freeze zone by means of the warehouse robot, which is arranged to be displaceable between the refrigerating zone and the deep-freeze zone, based on the detected individual identification of the items, the individual identification of the item includes the desired temperature and/or air humidity of storing the item;
   wherein the warehouse robot is designed to restore items which are temperature-sensitive in accordance with the storage conditions from the deep-freeze zone into the refrigerating zone; and
   wherein the items are automatically supplied to the input/output shaft by the automated warehouse robot after the inputting or texting of the individual identification associated with the items and/or actors.

8. The warehouse according to claim 7, wherein the means for detecting the individual identification of the items includes a scanning system and the system comprises an input/output system, the input/output system includes a keyboard or touchscreen and a printer or display for generating the individual identification.

9. The warehouse according to claim 7, wherein the storage robot comprises a receiving/discharge unit with a transport surface, and the items can be pushed onto, or drawn off, the transport surface by a pushing means.

10. The warehouse according to claim 7, wherein the warehouse is constructed to be modular and comprises isolated containers.

11. The warehouse according to claim 7, comprising a means for receiving of payments, in cash and/or a cashless manner, said payment means including a payment terminal, said warehouse is coupled via a communication interface to a data network.

12. The warehouse according to claim 11, wherein the receiving unit/discharge unit is arranged such that it can be moved automatically in a Y-Z plane by a rail system in an intermediate space formed between shelves in the shelf system.

13. The warehouse according to claim 11, wherein the pushing means is arranged such that it can be pushed and/or pivoted above the transport surface by a linear drive, or an articulated arm arrangement.

14. The warehouse according to claim 13, wherein the linear drive comprises longitudinal rails that run parallel to, or substantially parallel to, longitudinal edges of the support surface, and the linear drive comprises a transverse rail that can move along the longitudinal rails; and wherein the pushing means is arranged on the transverse rail such that it can move longitudinally and rotatably.

15. The warehouse according to claim 11, wherein the pushing means is arranged above the transport surface such that it can be pushed and/or pivoted by the articulated arm arrangement.

16. The warehouse according to claim 15, wherein the grasping means is configured as a vacuum suction means on which the item is fixed when it is being moved or attracted.

17. The warehouse according to claim 11, wherein the transport surface comprises limitations running in the longitudinal direction which are transverse to the direction of movement.

18. The warehouse according to claim 11, wherein the transport surface is arranged so that it can incline in the direction of the compartments of the shelves.

19. The warehouse according to claim 11, wherein the pushing means is constructed in a T shape, said T shape comprising a first shank which is connected to the articulated arm arrangement, or to the linear drive, and the first shank comprises a transverse running shank with a front surface comprising a grasping means, said grasping means including suction graspers.

20. The warehouse according to claim 11, wherein the transport surface has a U-shaped cross section.

21. The warehouse according to claim 20, wherein one or more suction means is integrated in the transport surface in order to fix the item during transport, the one or more suction means including a vacuum suction means.

22. The warehouse according to claim 11, wherein the pushing means can be shifted, pivoted, and/or adjusted in height relative to the transport surface.

* * * * *